United States Patent [19]

Ookawa et al.

[11] Patent Number: 4,733,070
[45] Date of Patent: Mar. 22, 1988

[54] ROTATIONAL INFORMATION OUTPUT DEVICE

[75] Inventors: Tadashi Ookawa; Hiroyuki Tomita, both of Funabashi; Masataka Yahara; Masaharu Muramatu, both of Chiba; Sumio Kobayashi, Funabashi; Hiroshi Sugai, Sakura; Hisakazu Ninomiya, Funabashi, all of Japan

[73] Assignee: Hitachi, Ltd., Tokyo, Japan

[21] Appl. No.: 806,340

[22] Filed: Dec. 9, 1985

[30] Foreign Application Priority Data

Dec. 7, 1984 [JP] Japan .................. 59-257505

[51] Int. Cl.4 ............................................. G01D 5/34
[52] U.S. Cl. ........................ 250/231 SE; 250/237 G
[58] Field of Search ............ 250/231 SE, 237 G, 205; 340/347 P

[56] References Cited

U.S. PATENT DOCUMENTS

| 3,809,895 | 5/1974 | Taisne | 250/205 |
| 4,580,047 | 4/1986 | Sasaki et al. | 250/237 G |
| 4,593,194 | 6/1986 | Graham et al. | 250/205 |
| 4,620,094 | 10/1986 | Tani et al. | 250/205 |
| 4,650,332 | 3/1987 | Muraoka et al. | 250/237 G |

Primary Examiner—Edward P. Westin
Assistant Examiner—Jessica L. Ruoff
Attorney, Agent, or Firm—Antonelli, Terry & Wands

[57] ABSTRACT

A fixed slit plate and a rotary slit plate which is secured to a rotating shaft are provided between two photoconductive elements and a light emitting element, and the two photoconductive elements provide two outputs which have the phase difference $\pi$ therebetween. These two outputs thus provided are added to extract the dc component, thereafter exerting feedback control over the light emitting element such that this dc component is maintained at a constant level.

7 Claims, 16 Drawing Figures

FIG. 14

ROTATIONAL INFORMATION OUTPUT DEVICE

BACKGROUND OF THE INVENTION

1. Field of the Invention

The present invention relates to a device which delivers information on the rotational state of a rotating shaft, for example, a rotating angle, a rotating speed and so forth, by using a sine-wave encoder.

2. Description of the Prior Art

An encoder is attached to the rotating shaft and so forth of a rotary machine and is used for the computation and control of the rotational position of the rotating shaft, the detection of its rotating speed and so forth.

As conventional encoders, pulse encoders whose output wave forms are pulsed are available, and, in addition to these types, sine-wave encoders whose output wave forms are in the shape of a sine wave are also available. These sine-wave encoders, whose outputs vary analogously, have the feature of enabling not only the discrimination of the interval following each pulse as a continuous quantity but also the detection of the rotating speed of a rotary machine, as a continuous quantity.

One of the methods of speed detection is practiced as follows.

Specifically, if an output signal is represented by $v = a \sin \omega t$, this signal is differentiated to give $dv/dt = a\omega \cos \omega t$. If $a\omega$ is extracted as the quantity of speed detection, the detected quantity can be obtained as the continuous quantity for the variations in $\omega$.

Therefore, sine-wave encoders have been utilized as analog sensors which are used for speed detection and position detection in order to control a servomotor. This application of a sine-wave encoder has been known and disclosed, for example, in the specifications of Japanese Patent Laid-Open No. 83061/1984, Japanese Patent Laid-Open No. 83062/1984, Japanese Utility Model Laid-Open No. 88143/1981, Japanese Utility Model Laid-Open No. 58365/1984 and Japanese Patent Publication No. 22963/1984, as well as other.

However, this type of sine-wave encoder sensor which employs a photosensor (a combination of a light emitting diode and a photodiode, or that of a light emitting diode and a phototransistor) is of no practical use since the output voltage of the sensor tends to be varied by approximately 50% because of variations in the quantity of light of the light emitting diode due to the temperature and the time-dependent changes thereof. Thus, it is considered that the correction of the quantity of light is effected for stabilization purposes on the light emitting diode. This method has already been disclosed in the specification of Japanese Patent Publication No. 22963/1984, which was successful in improving the light quantity to a certain extent. In this prior art method a signal detecting section and a light quantity correcting section employ an individual photoconductive element, respectively. The reason for this is that a signal is changed into a sine wave form due to an alternating current, and additionally, the frequency of the signal suffers from variations, thereby making it difficult to detect the light quantity by using a photoconductive element for detecting a signal. Therefore, an additional method was adopted to provide another photoconductive element for the correction of the light quantity, thereby enabling the light quantity to be detected so as to make correction. This method is based on the assumption that the photoconductive elements used in both sections possess the same temperature characteristics and time-dependent variations. However, in fact, each element shows different characteristics. Furthermore, since the overall temperature characteristics reach as high as 0.2%/°C., the element varies in characteristics by as much as 10% when the temperature of the element is varied by 50° C., and it can also be expected to vary by approximately 10% in relation to the time-dependent variations. As described above, although improvements have been made to a certain extent, the results thus provided remain unsatisfactory.

It is to be noted that, when a servomotor operates at several thousand rpm with the resolving power of an encoder being increased to as high as 1000–3000 ppr, the frequency range to be used becomes as wide as from 100 to 150 KHz. If the linearities of the characteristics are to be improved, frequency characteristics up to approximately 1 MHz are required. However, at present, conventional sine-wave encoders merely realize the frequency characteristics of −3 dB (a 29.3% attenuation) at 100 KHz.

As described above, conventional sine-wave encoders involve disadvantages in that their output voltages are greatly varied due to their temperature characteristics, and their linearities are deteriorated due to their frequency characteristics, so that they cannot exhibit satisfactory performance as sensors for use in a servomotor.

However, it has been found from experiments that, although a photodiode and a phototransistor show time-dependent variations, the degree of their variations is smaller than that of the variations of a light emitting diode, so that, if some measures are taken to compensate for the time-dependent variations of the light emitting diode, there is normally no problem in practical terms.

SUMMARY OF THE INVENTION

The present invention provides a rotational information output device which is arranged such that the quantity of light is corrected by using the signal of the very signal detecting photoconductive element so as to provide stabilizing characteristics.

The present invention is arranged so as to detect the quantity of light by using the signal detected by the signal detecting photoconductive element in order to cancel the influence of the variations in characteristics caused by time-dependent variations in a light emitting means. To this end, a signal A delivered by a first photoconductive means and a signal $\overline{A}$ delivered by a second photoconductive means whose phase is shifted by $\pi$ in relation to the signal A are employed and added to cancel the ac component by using A and $\overline{A}$ thus obtained. Thereafter the dc component, proportional to the quantity of light is extracted. This dc component provides negative feedback control to keep the magnitude of the signals A and $\overline{A}$ at a constant level.

BRIEF DESCRIPTION OF THE DRAWINGS

In the accompanying drawings, there is shown illustrative embodiments of the invention from which these and other objectives, novel features and advantages will be readily apparent.

In the drawings.

DESCRIPTION OF THE PREFERRED EMBODIMENTS

Figure 1:
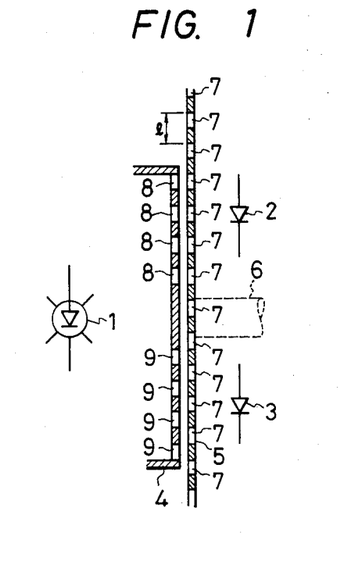
FIG. 1 is a schematic drawing of an essential portion of the device of this invention with a rotating slit plate and a fixed slit plate cut away on a diametrical line taken through a circle with the rotating shaft as its axis.

The sine-wave encoder of this invention which uses a photosensor comprises: a light emitting diode 1 serving as a light emitting means which radiates the optimum quantity of light in correspondence with the control of the quantity of light as shown in FIG. 1; photodiodes 2 and 3 serving as first and second photoconductive means which deliver electric signals in correspondence with the quantity of light which the same photodiodes have received; and a fixed slit plate 4 and a rotary slit plate 5 which are interposed between the light emitting diode 1 and the photodiodes 2 and 3. The rotary slit plate 5 is mechanically coupled with a rotating shaft 6 of a rotary machine and is provided with a multiplicity of slits 7 at equal intervals around the axis rotation. Also, the fixed slit plate 4 maintains a fixed positional relationship to the light emitting diode 1 and the photodiodes 2 and 3, wherein, if the interval between the respective slits formed in the rotary slit 5 is represented by l, slits 8 and 9 are formed with the pitch shifted by $nl+l/2$ especially at the portion which is in opposed relationship with the photodiode 2 and the portion which opposes the photodiode 3 such that, when the light emitting diode 1 applies the maximum quantity of light to the photodiode 2, only the minimum level of light may enter the photodiode 3 while conversely, when the light emitting diode 1 applies the maximum quantity of light to the photodiode 3, only the minimum quantity of light may enter the photodiode 2 (where n is 1, 2, 3, 4, . . . ).

Figure 2:
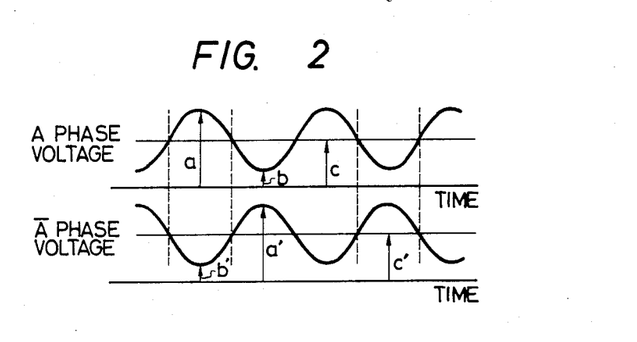
FIG. 2 shows the encoder output waveforms of two phases having a phase difference therebetween.

FIG. 2 illustrates the output voltages of the A and $\overline{A}$ phases obtained from the first and second photoconductive means 2 and 3. The $\overline{A}$ phase output voltage which is the output obtained from the second photoconductive means 3 varies with the phase shifted by $\pi$ in relation to the A phase output voltage which is the output obtained from the first photoconductive means 2.

In FIG. 2 symbols a and a' denote the maximum value of the respective outputs, symbols b and b' the minimum value and symbols c and c' the median value of the ac signals of the A and $\overline{A}$ phases.

As described above, the first and second photoconductive means generate signals wherein a dc bias voltage is added to an ac signal.

Figure 3:
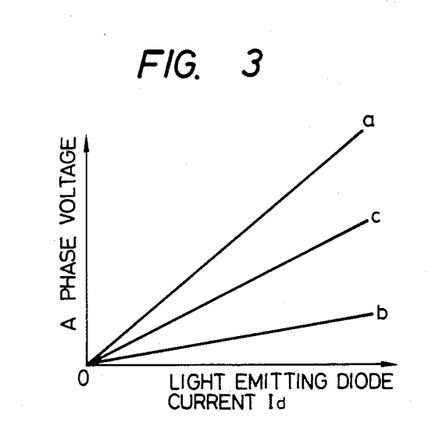
FIG. 3 is a characteristic diagram showing the relationship between the magnitude of the current flowing through the light emitting diode and the output voltage of one phase.

FIG. 3 is a graph showing the relationship between the current Id flowing through the photoconductive diode 1 and the A phase output voltage (and also the $\overline{A}$ phase output voltage), in which the respective output voltages a, b and c are in linearly proportional relationship with the current Id.

Accordingly, the amplitude a−b of the ac signal is also proportional to c.

Figure 4:
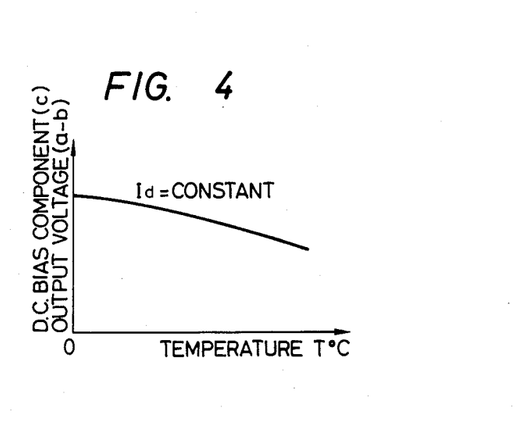
FIG. 4 shows the variation in the output voltage of one phase in relation to temperature changes.

FIG. 4 is a graph showing the relationship of the output voltage a−b and the d.c. bias component c to the ambient temperature T° C., in which the output has the tendency to diminish with a rise in the temperature rise. This tendency is attributable to the characteristics whereby, when the light emitting diode 1 maintains the current Id at a contant level, the light quantity is reduced as the temperature rises.

However, as can be seen from FIG. 3, the encoder output voltage of each phase can be kept at a constant level by adjusting the current Id. To this end, the arrangement has only to be such that the light quantity is regulated at a constant level by the detection of the light quantity.

A distinctive feature of this invention is that the output of the first and second photoconductive elements 2 and 3 are used as feedback control.

Figure 5:
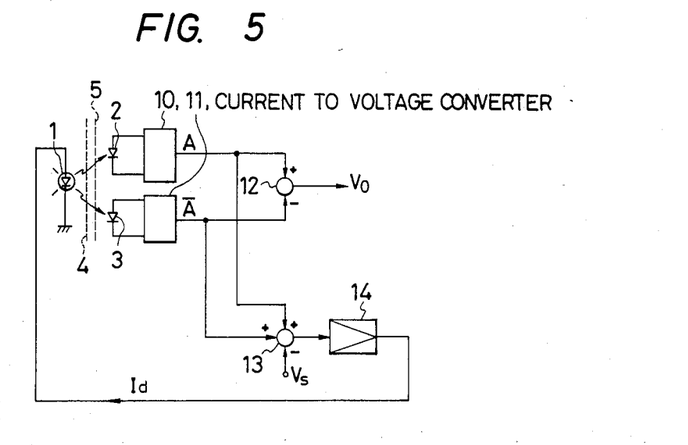
FIG. 5 is a block diagram showing an embodiment of this invention.

FIG. 5 is a block diagram showing one preferred embodiment of the device of the present invention.

In this figure, reference characters 10 and 11 denote current/voltage converters which convert the outputs of the first and second photoconductive elements 2 and 3 into currents, and reference character 12 denotes a differential amplifier which provides the difference between the outputs A and $\overline{A}$, and the output from the amplifier 12 becomes an encoder output Vo. Reference character 13 denotes a comparator circuit which provides the summation of the outputs A and $\overline{A}$ to extract the dc component contained by the outputs of the first and second photoconductive elements 2 and 3 so as to further compare the result thus obtained with a reference voltage Vs. Reference character 14 is an amplifier circuit for amplifying the output from the comparator circuit 13. The current Id flows through the light emitting diode 1 by virtue of the output from the amplifier 14, thereby exerting feedback control over the dioide 1.

In other words, this embodiment is arranged such that one portion of the comparator circuit 13 separates the dc component and further, the other portion of the comparator circuit 13 and the amplifier circuit 14 exert control over the quantity of light. Therefore, the output Id from the amplifier circuit 14 becomes the input for controlling the quantity of light.

As the light quantity of the light emitting diode 1 is reduced due to temperature and time-dependent variations, the light supplied to the photoconductive elements 2 and 3 becomes less and the output voltages of the A and $\overline{A}$ phases are reduced. Accordingly, the output from the comparator circuit 13 diminishes, thereby making the output current Id smaller. In other words, control is exerted over this circuit in such a manner that A+$\overline{A}$ becomes equal to Vs. Therefore, if A=α sin ωt+β and $\overline{A}$=−α sin ωt+γ, control is exerted such that A+$\overline{A}$=β+γ becomes equal to Vs. Since β+γ is not only a direct current but also a value proportional to the output (through β and γ are dc components of the A and $\overline{A}$ phase voltages), the output Vo is able to be kept at a constant level.

Figure 6:
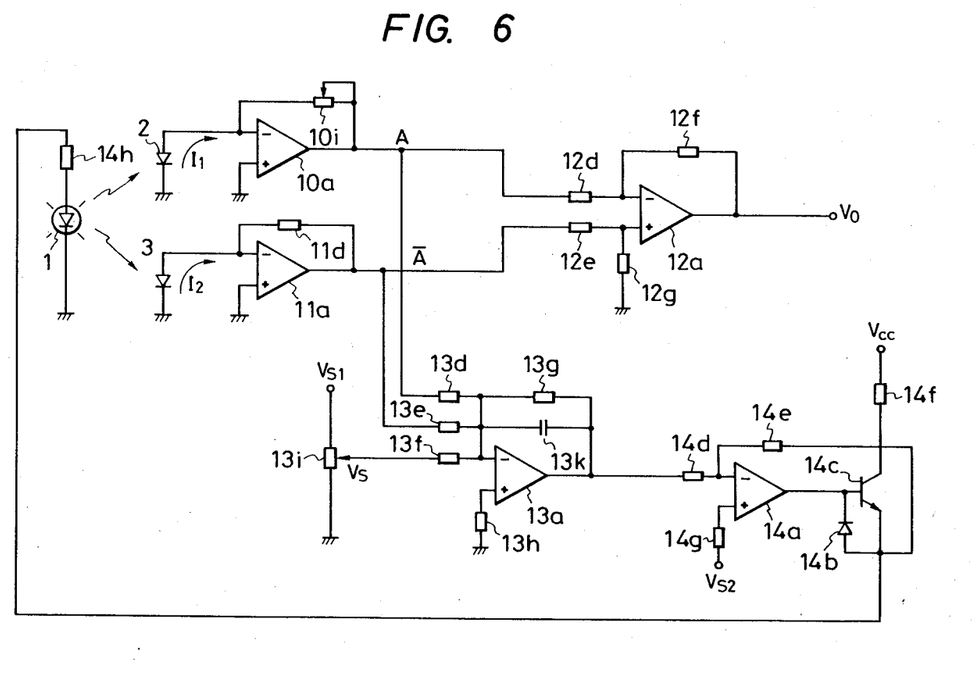
FIGS. 6, 7 and 14 are circuit diagrams showing different embodiments, respectively.

FIG. 6 is a circuit diagram showing one specific circuit of this invention. In this figure, reference characters 10a to 14a denote operational amplifiers, 14b a diode, 14c' a transistor, 11d, 12d to 12g, 13d to 13h and 14d to 14g resistors, 10i and 13i variable resistors, 13k a condenser, and $V_{S1}$ and $V_{S2}$ reference voltage sources.

In FIG. 6, like reference characters are used to denote the like or corresponding circuit elements which constitute each of the components shown in FIG. 5. Thus, for example, the current/voltage converter 10 is constituted by the elements 10a and 10i.

In this circuit, the dc component is separated by the elements 13d and 13e with the quantity of light controlled by the elements 13a, 13f to 13i, and 14a to 14g.

The light from the light emitting diode 1, passing the slits 7, 8 and 9 of the fixed and rotatary slit plates 4 and 5, not shown in FIG. 6, causes currents $I_1$ and $I_2$ proportional to the light quantity to flow through the first and second photoconductive elements 2 and 3. These currents $I_1$ and $I_2$, passing through the feedback resistors 10i and 11d of the operational amplifiers 10a and 11a, provide signal voltages A and $\overline{A}$. In this portion of the circuit, the magnitudes of the voltages A and $\overline{A}$ are regulated by the variable resistor 10i such that the a.c. component is canceled due to A+$\overline{A}$. Thereafter, the signals A and $\overline{A}$, passing the resistors 13d and 13e, are delivered to one terminal of the operational amplifier 13a while the reference voltage Vs is delivered to the amplifier 13a through the resistor 13f. In a case where A and $\overline{A}$ are negative voltages, the reference voltage Vs is rendered a positive voltage. The variable resistor 13i is actuated to so adjust the initial value that the output of the operational amplifier 13a shows 0[V] or a little more positive voltage value, thereby ensuring a wide operational range. The capacitor 13k is inserted as a filter for absorbing noise and unbalance from A and $\overline{A}$. The output of the operational amplifier 13a is subjected to current amplification by way of the operational amplifier 14a and the transistor 14c, thus allowing a current to flow through the light emitting diode 1. In this portion of the circuit, the transistor 14c is inserted for the purpose of current amplification, and, if a sufficient current can be supplied by the operational amplifier 14a alone, this transistor is not particularly needed.

In the case of reduction in the quantity of light, the value of A+$\overline{A}$ or the dc component becomes smaller to thereby shift the output of the operational amplifier 13a in the direction of a negative voltage. The operational amplifier 14a makes an inverted amplification of the shifted output of the operational amplifier 13a, thereby increasing the current flowing through the light emitting diode 1, with the result that feedback control is exerted in such a manner that A+$\overline{A}$ is consistently kept at a constant value.

On the other hand, the respective output of the A and $\overline{A}$ phases are amplified by the difference therebetween to provide the encoder output Vo, where, since A and $\overline{A}$ are adjusted equally in magnitude, it follows that, $A = \alpha \sin \omega t + \beta$ $\overline{A} = -\alpha \sin \omega t + \beta$ $A - A = 2\alpha \sin \omega t$ A and $\overline{A}$ thus becoming signals containing no dc component.

Figure 7:
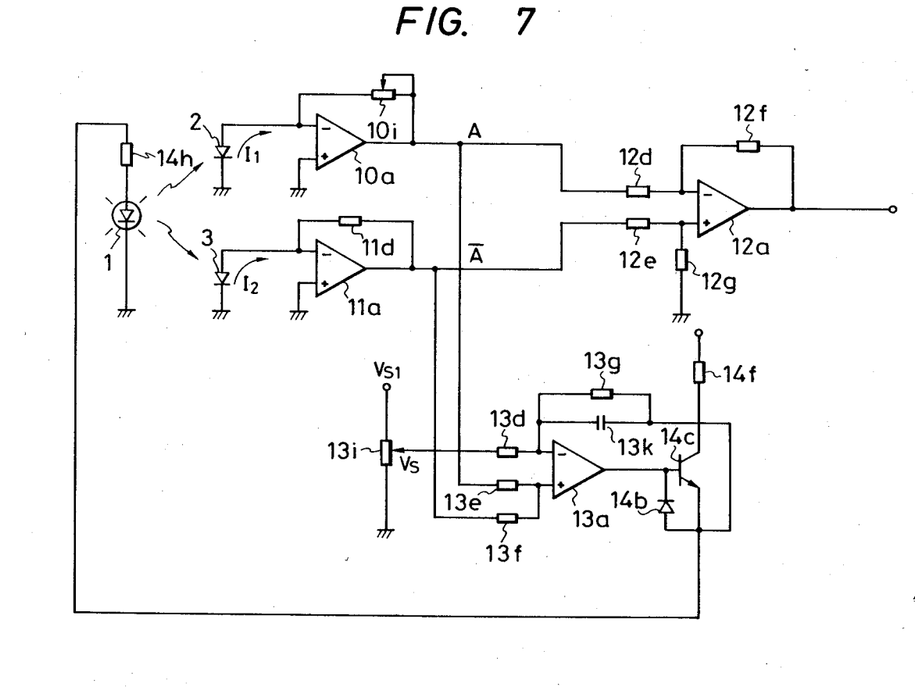

FIG. 7 is a circuit diagram showing another embodiment of this invention. The difference between FIGS. 7 and 6 is that a component equivalent to the inverting operational amplifier 14a is removed in FIG. 7. Thus, since one inverting operational amplifier is eliminated, it is necessary to match the operating polarity of the whole circuit. For this purpose, A+$\overline{A}$ is fed to the positive input of the operational amplifier 13a for the purpose of inverting the polarity. The other operations are the same as those shown in FIG. 6.

Figure 8:
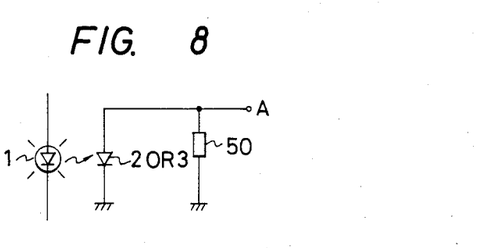
FIG. 8 is a circuit diagram showing an example of the conversion wherein the photodiode output is changed into a voltage.
Figure 9:
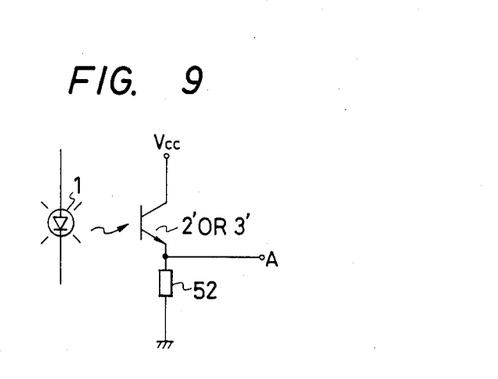
FIG. 9 is a circuit diagram showing an example of the conversion wherein the phototransistor output is changed into a voltage.

FIG. 8 is a schematic circuit diagram wherein the output currents of the photodiodes 2 and 3 are converted into voltages by a resistor 50 without using any operational amplifier. Also, FIG. 9 is a schematic circuit diagram wherein phototransistors 2' and 3' are used as a photoconductive element. Reference character 52 denotes a resistor with symbol Vcc a source voltage. By using the output of each circuit of FIGS. 8 and 9 as well, in the same way as those of FIGS. 6 and 7, the dc component is extracted by adding A to $\overline{A}$, the output so obtained being used as a feedback signal, thereby enabling the current Id flowing through the light emitting diode to be kept at a constant level.

Figure 10:
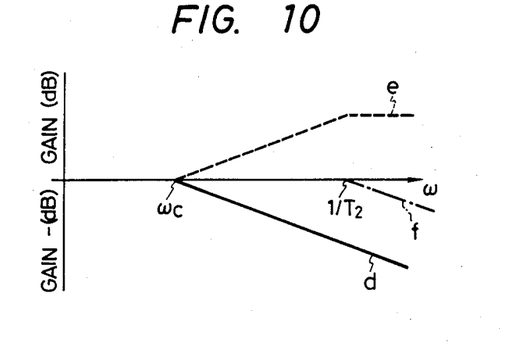
FIG. 10 is a graph showing the frequency characteristics of the encoder output when the respective photoconductive elements are arranged as shown in FIGS. 8 and 9.
Figure 11:
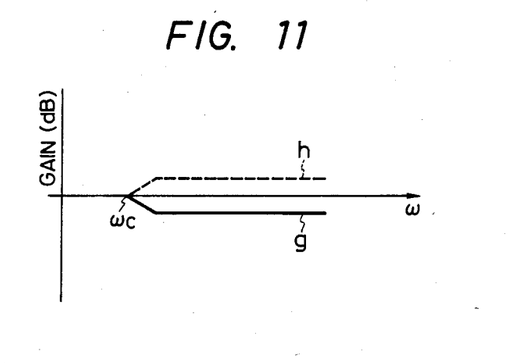
FIG. 11 is a graph showing the frequency characteristics of the output circuit for delivering a signal with a certain phase by way of the photodiodes shown in FIGS. 6 and 7 and an operational amplifier.

FIGS. 10 and 11 are graphs showing the frequency characteristics of the encoder output. FIG. 10 shows the characteristics of the photoconductive elements which are arranged as shown in FIGS. 8 and 9. In FIG. 10, a characteristic curve d denotes the encoder characteristics, and in order to improve the frequency characteristics it suffices to correct the frequency as shown by the broken line e. This correction enables the frequency characteristics to be improved as shown by the one dot-chain line f.

FIG. 11 is a graph showing the frequency characteristics of the circuit which delivers the signals of the A and $\overline{A}$ phases by way of the photodiodes and the operational amplifiers shown in FIGS. 6 and 7. It is considered that the circuit arrangements shown in FIGS. 6 and 7 are such that no response delay due to the coupling capacity of the photodiode takes place by virtue of the effect of the imaginary short realized by the operational amplifier. However, this circuit in fact exhibits the characteristics shown by the line g of FIG. 11. In order to correct this characteristic curve, it suffices to effect the phase correction shown by the broken line h.

Figure 12:
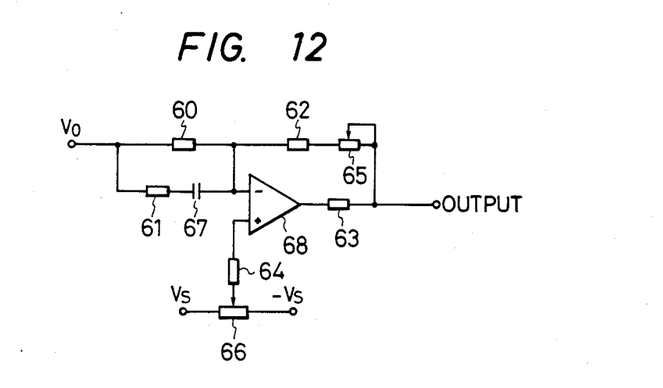
FIG. 12 shows an example of the circuit which corrects the phases shown in FIGS. 10 and 11.

FIG. 12 shows a circuit for correcting the phases shown in FIGS. 10 and 11. If the output Vo of FIGS. 6 and 7 is fed to the input of the circuit of FIG. 12, it is possible to obtain an output having improved characteristics.

In FIG. 12, reference characters 60 to 64 denote resistors, reference characters 65 and 66 variable resistors, reference charaters 67 a capacitor and reference characters 68 an operational amplifier. The variable resistor 66 is used for a dc bias adjustment of the output signal.

Calculating the transfer function G(s) of the circuit of FIG. 12 gives;

$$G(s) = \frac{Zf(s)}{Z_1(s)} \;;$$

where $$Z_1(s) = \frac{R_{60}\left(R_{61} + \frac{1}{sc}\right)}{R_{60} + \left(R_{61} + \frac{1}{sc}\right)}$$

$$= R_{62} + R_{65}$$

(where the subscript of each R denotes the parts number used in FIG. 12.)

Hence, $$G(s) = \frac{(R_{62} + R_{65})}{R_{60}} \times \frac{1 + (R_{60} + R_{61})cs}{1 + R_{61} cs} \quad (1)$$

$$= K \cdot \frac{1 + T_1 s}{1 + T_2 s}$$

where $$K = \frac{R_{62} + R_{65}}{R_{60}}$$

$$T_1 = (R_{60} + R_{61})c$$

$$T_2 = R_{61}c$$

Figure 13:
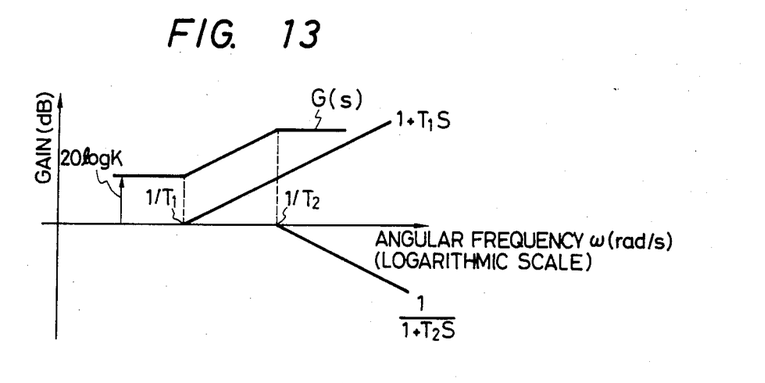
FIG. 13 shows the transfer functions of the circuit shown in FIG. 12.

Illustrating the transfer function thus obtained by using a well known Bode diagram generally gives what is shown in FIG. 13.

As shown in FIGS. 10 and 11, if the cut-off frequency $\omega c$ of the output Vo is to be equal to $1/T_1$ shown in the Bode diagram of FIG. 13, the characteristic curve f consisting of a combination of two characteristics is obtained, and in the case of FIG. 10, it is possible to improve the frequency characteristic such that the frequency range up to $1/T_2$ becomes flat. Also, in the case of FIG. 11, it is possible to cancel the gain drop above $\omega c$.

Figure 14:
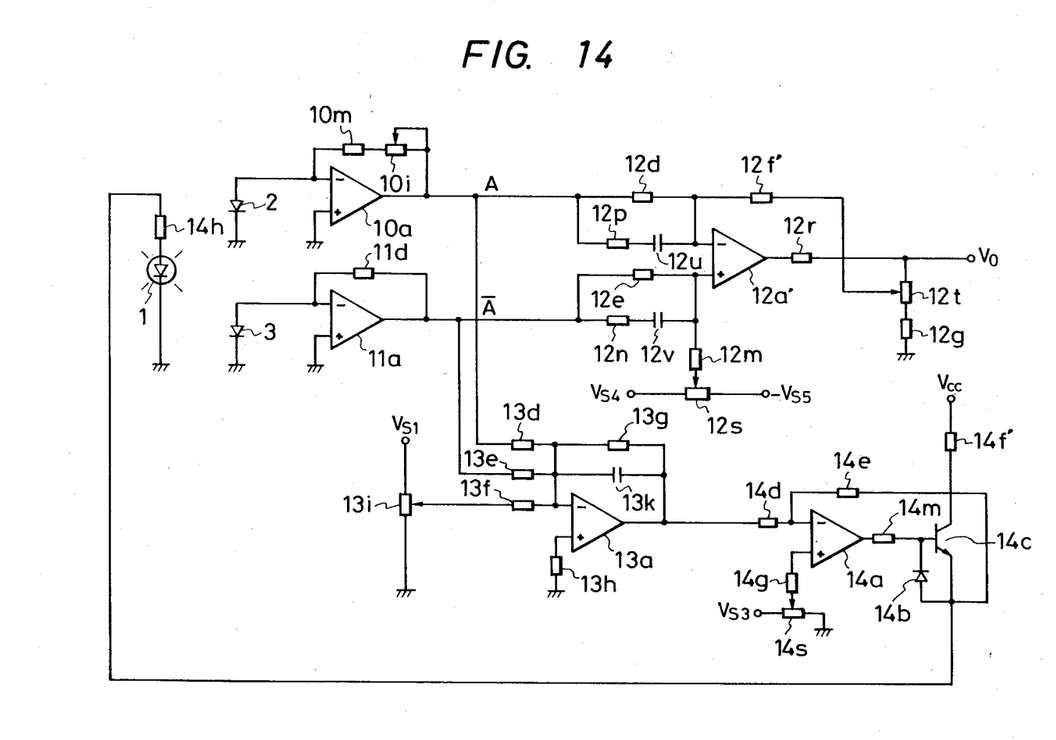

FIG. 14 shows a phase correcting circuit which is arranged such as to also serve as a differential amplifier.

In this figure, reference characters 10m, 12m, 12n, 12p, 12g, 12r and 14m denote resistors, reference characters 12s, 12t and 14s variable resistors, reference character 12a' an operational amplifier, and reference characters 12u and 12v capacitors.

Figure 15:
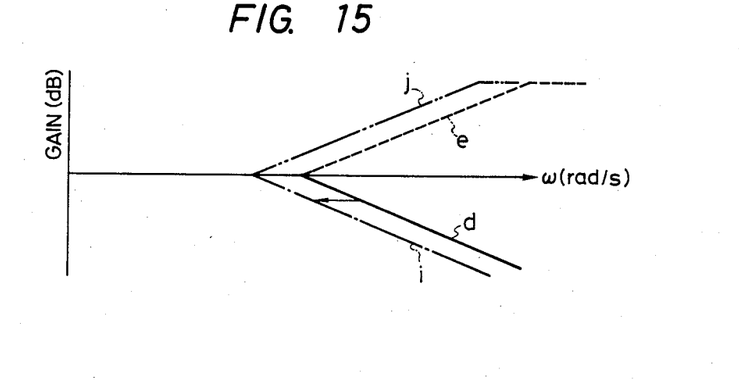
FIGS. 15 and 16 are graphs showing the temperature characteristics of the photoconductive elements.
Figure 16:
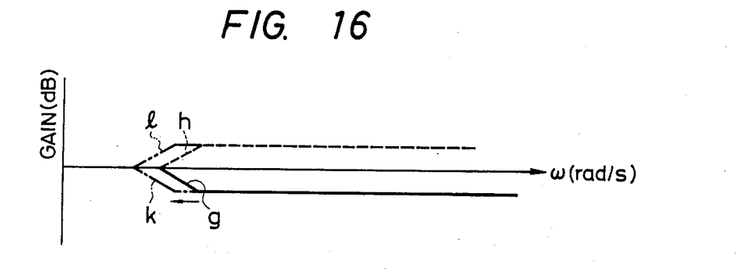

FIGS. 15 and 16 are graphs showing the temperature-dependent characteristic curves. It was confirmed through experiments that, with respect to the frequency characteristics, the characteristic curves of the photodiode and the phototransistors are shifted from d to i as shown in FIG. 15 and from g to k as shown in FIG. 16 due to a rise in temperature. For this reason, although the phase correcting circuits shown in FIGS. 12 and 14 can improve the frequency characteristics, variations in characteristics to temperature changes cannot be corrected.

Since a servomotor and its controller are normally mounted at different places, the ambient temperature of the encoder commonly differs from that of the controller. Therefore, it is difficult to correct the temperature characteristics of the encoder and the photosensor by using the circuit provided within the encoder. Thus, in the case of inserting a circuit for further correcting the phase correcting circuit in correspondence with temperature changes, it is better to insert the circuit into the encoder.

Since the frequency characteristics depend upon the temperature characteristics, the phase correcting circuit has only to show temperature variations in the same manner as the frequency characteristics. To realize this effect, as the resistors 61, 12p and 12m shown in FIGS. 12 and 14, an element which has a positive temperature coefficient is used so as to provide the characteristics j and l shown in FIGS. 15 and 16.

Specifically, as $R_{61}$ in the equation (1) described above becomes larger due to temperature variations, $T_1$ and $T_2$ become larger as the characteristic curve shifts leftward on the Bode diagram of FIG. 13, for example. It follows that the behavior of $1/T_1$ becomes equal to that of the cut-off frequency $\omega t$ in relation to temperature variations.

Also, if an element which has a positive temperature coefficient is used for $R_{60}$, only $1/T_1$ can be shifted leftward, thereby enabling correction the characteristic in a similar manner. This realizes optimum frequency characteristics irrespective of temperature variations.

What is claimed is:

1. A rotational information output device for use with a rotating shaft comprising: a light emitting means which emits the optimum quantity of light in correspondence with a control input for controlling the quantity of light; first and second photoconductive means which deliver electric signals in correspondence with the quantity of light which said photoconductive means receive; a fixed and a rotary slit plate, being disposed between said first and second photoconductive means and said light emitting means, which intermittently interrupt light entering from said light emitting means into said first and second photoconductive means such that said second photoconductive means delivers a signal whose phase is shifted $\pi$ in relation to said first photoconductive means in correspondence with the rotation of a rotating shaft; a dc component separating means which receives the output from said first and second photoconductive means and extracts the dc component contained in the output of said first and second photoconductive means, and a means of controlling the quantity of light which controls said input for the purpose of controlling the quantity of light in such a manner as to keep the output of said dc component separating means at a constant level.

2. A rotational information output device for use with a rotating shaft comprising: a light emitting means which radiates the optimum quantity of light in correspondence with the magnitude of a current; a first and a second light emitting means which deliver electric signals in correspondence with the quantity of light which said light emitting means receive; a fixed slit plate and a rotary slit plate fixedly provided on said rotating shaft, being disposed between said first and second photoconductive means and said light emitting means, which control light entering from said light emitting means into said first and second photoconductive means such that said second photoconductive means delivers a signal whose phase is shifted $\pi$ in relation to said first photoconductive means in correspondence with the rotation of said rotating shaft; an adding means which calculates the output of the sum relating to the outputs of said first and second photoconductive means; and a means of controlling the quantity of light which controls the magnitude of said current flowing through said light emitting means such as to keep the output of said adding means at a constant level.

3. A rotational information output device according to claim 2, wherein said light emitting means is a light emitting diode.

4. A rotational information output device according to claim 3, wherein said first and second photoconductive elements are photodiodes, respectively.

5. A rotational information output device according to claim 3, wherein said first and second photoconductive elements are phototransistors, respectively.

6. A rotational information output device according to claim 2, wherein said first and second photoconductive elements are current sources and said adding means are arranged such that the outputs of said first and second photoconductive elements are converted into voltages, thereafter adding both outputs thus obtained.

7. A rotational information output means according to claim 2, whose arrangement is such that a subtracting circuit for calculating the output of the difference relating to the outputs of said first and second photoconductive elements is provided and the output of said subtracting circuit is extracted as the rotational information regarding said rotating shaft.

* * * * *